(12) United States Patent
Villela

(10) Patent No.: US 8,417,884 B1
(45) Date of Patent: Apr. 9, 2013

(54) METHODS AND SYSTEMS FOR CONTROLLING MULTIPLE OPERATIONS OF DISK DRIVES

(75) Inventor: Caio Botelho Villela, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 642 days.

(21) Appl. No.: 12/135,923

(22) Filed: Jun. 9, 2008

(51) Int. Cl.
*G06F 12/00* (2006.01)

(52) U.S. Cl.
USPC .............. 711/112; 711/114; 711/162

(58) Field of Classification Search ............ 711/162
See application file for complete search history.

(56) References Cited

U.S. PATENT DOCUMENTS

| | | | |
|---|---|---|---|
| 6,058,372 A * | 5/2000 | Sweet et al. | 705/16 |
| 6,076,143 A * | 6/2000 | Blumenau | 711/114 |
| 6,151,665 A * | 11/2000 | Blumenau | 711/162 |
| 6,170,037 B1 * | 1/2001 | Blumenau | 711/114 |
| 6,484,235 B1 * | 11/2002 | Horst et al. | 711/114 |
| 6,487,633 B1 * | 11/2002 | Horst et al. | 711/112 |
| 6,591,338 B1 * | 7/2003 | Horst et al. | 711/114 |
| 6,591,339 B1 * | 7/2003 | Horst et al. | 711/114 |
| 6,654,862 B2 * | 11/2003 | Morris | 711/162 |
| 6,681,290 B2 * | 1/2004 | Brower et al. | 711/114 |
| 7,624,233 B2 * | 11/2009 | Kavian | 711/115 |
| 2002/0087788 A1 * | 7/2002 | Morris | 711/114 |
| 2003/0009697 A1 * | 1/2003 | Uehata et al. | 713/201 |
| 2005/0138307 A1 * | 6/2005 | Grimsrud et al. | 711/162 |

OTHER PUBLICATIONS

"Logical Block Addressing," *Wikipedia*, Downloaded from http://en.wikipedia.org/wiki/Logical_block_addressing on Jun. 2, 2008; 2 pages.

* cited by examiner

*Primary Examiner* — Mardochee Chery
(74) *Attorney, Agent, or Firm* — Sterne, Kessler, Goldstein & Fox P.L.L.C.

(57) ABSTRACT

Systems and methods for controlling multiple operations of disk drives are described herein. An embodiment includes, receiving firmware to control a disk drive, processing the firmware, configuring the disk drive in a performance mode and a storage mode based on the processing step, storing original data and at least one mirror copy of the original data on an outer region of a disk, if the disk drive is configured in the performance mode in the configuring step, and storing original data throughout the disk including all inner and outer regions, if the disk drive is configured in the storage mode in the configuring step. In this way, a disk drive may be configured for multiple operations.

7 Claims, 5 Drawing Sheets

METHODS AND SYSTEMS FOR CONTROLLING MULTIPLE OPERATIONS OF DISK DRIVES

BACKGROUND

1. Field of the Invention

The present invention relates to disk drive technology.

2. Related Art

Computer systems such as servers and personal computers are used for a wide variety of applications. With the rapid growth of the Internet, several computer systems are being used for the purposes of storing data, for example, video data and other storage-centric applications. Computer systems are also being used for performance-centric applications such as scientific computing and high speed data retrieval over networks.

In most cases, as computer systems age, they get redeployed from performance-centric applications to more storage-centric applications. Computer systems may get re-deployed to storage-centric applications because their hardware may no longer be suited for performance-centric applications. For example, computer systems with faster processors may become available that may replace older processors in existing computer systems.

BRIEF SUMMARY

Embodiments of the present invention relate to controlling multiple operations of disk drives. A method embodiment includes, receiving firmware to control a disk drive, processing the firmware, and configuring the disk drive in a performance mode or a storage mode based on the processing step. In a performance mode, original data plus at least one mirror copy of the data are stored on an outer region of a disk. In a storage mode, no mirror copies need to be used and all original data can be stored throughout the disk including inner and outer regions.

A system embodiment includes, a firmware receiver to receive firmware to control a disk drive, a firmware processor to process the firmware, a disk controller to configure the disk drive based on the firmware, a data writer to store original data and at least one mirror copy of the data on an outer region of a disk, if the disk drive is configured in the performance mode and to store all original data throughout the disk including all inner and outer regions, if the disk drive is configured in the storage mode.

In this way, disk drives may be configured in a storage-centric mode or a performance-centric mode based on received firmware.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the invention relate to systems and methods for controlling multiple operations of disk drives. In embodiments of the invention, a disk drive is configured in a performance-centric mode or a storage-centric mode based on firmware. A firmware processor then processes the firmware to control a disk controller that writes data onto a disk.

In this way, a disk drive may be configured for either performance-centric use or storage-centric use based on firmware.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "firmware" used herein refers to a set of instructions associated with hardware that may be processed to control one or more operations. As an example, firmware may be a computer program that is embedded in a hardware device, for example a microcontroller. It can also be provided on flash ROM(s) or as a file that can be uploaded onto existing hardware by a user. These examples are illustrative and are not intended to limit the invention.

The term "logical block address" used herein refers to a location of a block of data stored on a disk associated with a disk drive. As an example, a block of data may be represented in bytes. This example is illustrative and is not intended to limit the invention.

This detailed description of the embodiments of the present invention is divided into several sections as shown by the following table of contents.

TABLE OF CONTENTS

1. System
2. Disk Controller
3. Performance-Centric Mode of a Disk Drive
4. Storage-Centric Mode of a Disk Drive
5. Configuring a Disk Drive in Performance-Centric and Storage-Centric Modes

1. System

Figure 1:
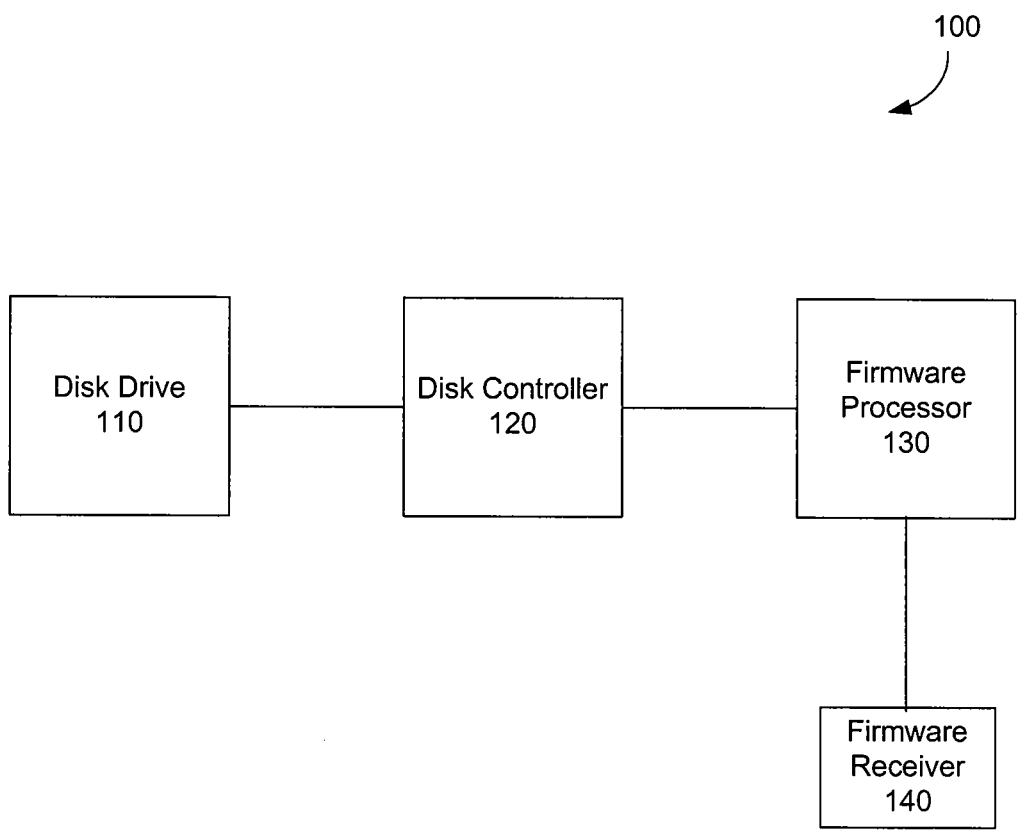
FIG. 1 is a diagram of system for controlling multiple operations of disk drives according to an embodiment of the invention.

This section describes a system for controlling multiple operations of disk drives according to an embodiment of the invention illustrated in FIG. 1. FIG. 1 is a diagram of a system 100 for controlling multiple operations of disk drives.

System 100 includes disk drive 110, disk controller 120, processing unit 130 and firmware receiver 140.

Disk drive 110, for example, may be any form of a hard disk drive. Hard disk drives and other similar storage devices are well known to person of skill in the art. As an example, a hard disk drive (HDD) is a non-volatile storage device which stores digitally encoded data on rapidly rotating disks with magnetic surfaces.

Figure 3:
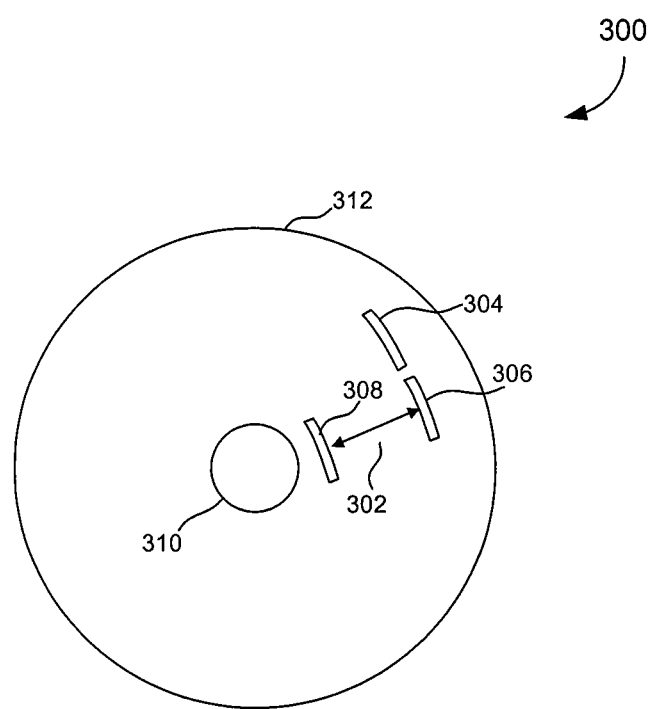
FIG. 3 is a diagram illustrating data at logical block addresses at an outer rim and inner region of a disk associated with a disk drive.

FIG. 3 illustrates an exemplary disk 300 that may be used in disk drive 110. FIG. 3 also illustrates exemplary regions of disk 300 associated with different logical byte addresses. Furthermore, as illustrated by FIG. 3, data may be stored on regions 304 and 306 of disk 300. Exemplary regions 304 and 306 are located on an outer rim of disk 300. Region 308 is located on an inner rim of disk 300. Distance 302 represents an approximate distance between region 308 on the inner rim of disk 300 and region 306 on an outer rim of disk 300. Region 310 represents an area of disk 300 through with a spindle (not shown) may pass through. The use of a spindle in a disk drive is known to those skilled in the art. As an example, a spindle may act as a physical axis of rotation for disk 300. Thus, disk 300 may rotate around a spindle located in region 310 while data is being accessed or written by a data reader/writer on disk 300.

Each region of data on disk 300 may be associated with a logical block address (LBA). Logical block addressing is a scheme known to those skilled in the art, used for specifying the location of blocks of data stored on computer storage devices, generally secondary storage systems such as hard disks. As an example, not intended to limit the invention, logical blocks in modern computer systems are typically 512 or 1024 bytes each. Furthermore, for example, in logical block addressing, blocks are located by an index, with the first block being LBA=0, the second LBA=1, and so on. These examples are purely illustrative and are not intended to limit the invention.

Although a hard disk drive is used as an example of disk drive 110, it is to be appreciated that any other form of media used to store data may be used.

Disk controller 120 may control the operation of disk drive 110. As an example, disk controller 120 may control the movement of data reader/writer 230. As an example, data reader/writer 230 may be used to physically write data onto a magnetic disk associated with disk drive 110. The operation of disk controller 120 according to an embodiment of the invention is described in detail further in the description.

Processing unit 130 may be used to process firmware that may be received by system 100. As an example, not intended to limit the invention processing unit 130 may be any for of microcontroller or microprocessor that interprets, compiles and executes instructions. Processing unit 130 may be embodied in software, firmware, hardware or any combination thereof.

Firmware receiver 140 may be used to receive performance-centric and storage-centric firmware and other firmware that may modify the operation of disk drive 110. As an example, not intended to limit the invention, firmware receiver 140 may receive firmware from a user. In another example, firmware receiver 140 may receive firmware from a memory (not shown) associated with disk drive 110. Firmware may be "flashed" or written onto the memory from where it may be read by firmware receiver 140. These examples are illustrative and are not intended to limit the invention.

In this way, system 100 may receive or generate and process firmware for operating disk drive 110. In an embodiment, the received or generated firmware may configure disk drive 110 in a performance-centric mode or a storage-centric mode.

2. Disk Controller

Disk controller 120 may control the operation of disk drive 110. As an example, disk controller 120 may control the movement of a drive head (not shown) associated with disk drive 110. As an example, a drive head may be used to physically write data onto a magnetic disk associated with disk drive 110.

Figure 2:
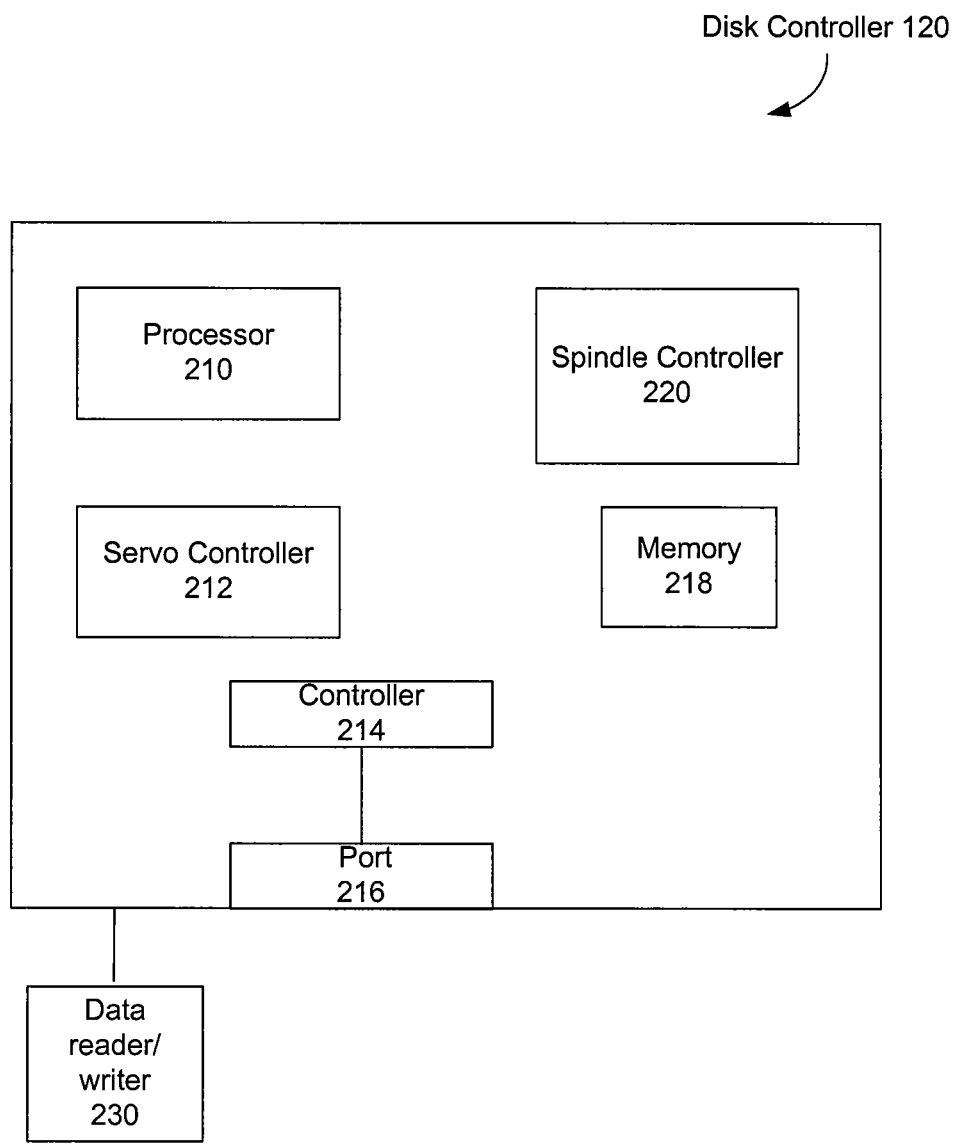
FIG. 2 is a block diagram of an exemplary disk controller according to an embodiment of the invention.

FIG. 2 illustrates disk controller 120 in greater detail. In an embodiment, disk controller includes microprocessor 210, spindle controller 220, servo controller 210, memory 218, controller 214 and port 216.

Microprocessor 210 may be used to control the operation of spindle controller 220, servo controller 210, memory 218, controller 214 and port 216.

Spindle controller 220 may be used to control the operation of a spindle (not shown) around which disk 300 or any other disk associated with disk drive 110 rotates. For example, when data is to be read from disk drive 110, spindle controller may rotate a spindle in a manner such that the appropriate data is available at a location of data reader/writer 230. Data reader/writer 230 may then read the data. Spindle controller may rotate the spindle at a rate that may be expressed in revolutions per minute (rpm).

Servo controller 212 may control the operation of a servo motor that rotates the spindle. Servo controller 212 may modify servo motor speed, torque and other characteristics of the servo motor. As an example, servo controller may receive information from microprocessor 210 to control the servo motor.

Memory 218 may be any form of volatile or non-volatile memory that may be used by microprocessor 210 to store data or access one or more instructions to control the operation of spindle controller 220, servo controller 212, and controller 214. Additionally, servo controller 212, spindle controller 220 and controller 214 may write data to or read data from memory 218.

Controller 214 may control the transfer of data through port 216. Port 216 may be used to interface or connect disk drive 110 to other devices. As an example, not intended to limit the invention, controller 214 may be a serial ATA (SATA) controller controlling the transfer of data between disk drive 110 and any other device though port 216.

3. Performance-Centric Mode of a Disk Drive

In a performance-centric mode, disk drive 110 may retrieve data at a higher rate than its usual rate of data retrieval. Faster retrieval of data from disk drive 110 may be necessary for applications where a longer latency in retrieval of data may degrade a user experience. As an example, Internet sites such as YouTube may need to provide videos requested by a user in a fast and efficient manner. Delays in providing a video to a user may degrade user experience. Furthermore, faster data retrieval may be needed in several scientific or mission critical operations.

In a performance-centric mode, data may be written on a disk in disk drive 110 in a manner that allows for faster retrieval of data. In an embodiment, data is stored at a first logical block address and a copy of the data at a second logical block address such that the second logical block address is at a location on the disk which is one hundred and eighty degrees apart from a location of the first logical block address on an region of the disk. In an embodiment, the region of a disk at which the data is stored may be located on an outer rim of the disk.

Figure 4:
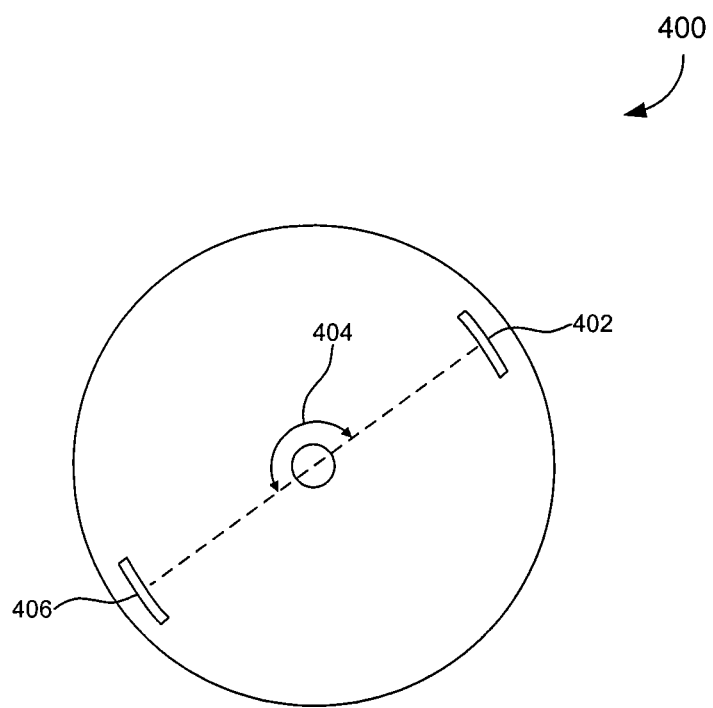
FIG. 4 is a diagram illustrating data written on a disk in performance mode, according to an embodiment of the invention.

FIG. 4 illustrates and exemplary disk 400 associated with disk drive 110 that has data written at logical block addresses in the performance mode. Disk 400 includes a data stored at region 402 and a copy of the data stored at region 406. In an embodiment, region 402 and region 406 are associated with LBAs that are one hundred and eighty degrees apart as illustrated by angular displacement 404.

Thus, a copy of data at a given LBA is stored at a region on disk 400 that at an LBA that is one hundred and eighty degrees apart from the given LBA. As data and a copy of the same data are stored one hundred and eighty degrees apart, data is more likely to be read and retrieved by data reader/writer 230 while it is traversing disk 400 to locate the data. This is because data or a copy of the data may always be available at a location that is requires data reader/writer 230 to traverse less one hundred and eighty degrees of disk 400.

In this way, data may be retrieved from disk drive 110 in a manner that increases performance of disk drive 110. The example of angular displacement 404 being one hundred and eighty degrees is illustrative and not intended to limit the invention. Other angular displacements may be used. For example, angular displacement 404 may be one hundred and twenty degrees with three total copies of data around the disk.

4. Storage-Centric Mode of a Disk Drive

In a storage-centric mode, data is stored on disk drive 110 in a manner that optimizes disk drive 110 for storage-centric operation. As an example, in a storage-centric operation, a large amount of data may need to be stored on disk drive 110. Storage-centric use for example may include uses such as archival of large amounts of data that may not necessarily be retrieved frequently.

In an embodiment, in a storage-centric mode data may be written to disk drive at any available LBA. For example, data may be written at a logical block address that may not have any data associated with it.

In this way, data may be stored on disk drive 110 to optimize disk drive 110 for storage.

5. Configuring a Disk Drive in Performance-Centric and Storage-Centric Modes In an embodiment, firmware processor 130 may switch disk drive 110 between performance-centric mode and a storage-centric mode based on firmware that may be received.

In an embodiment, once firmware receiver 140 receives firmware, from a user or any other delivery mechanism, it is processed by firmware processor 130 and provided to disk controller 120.

Figure 5:
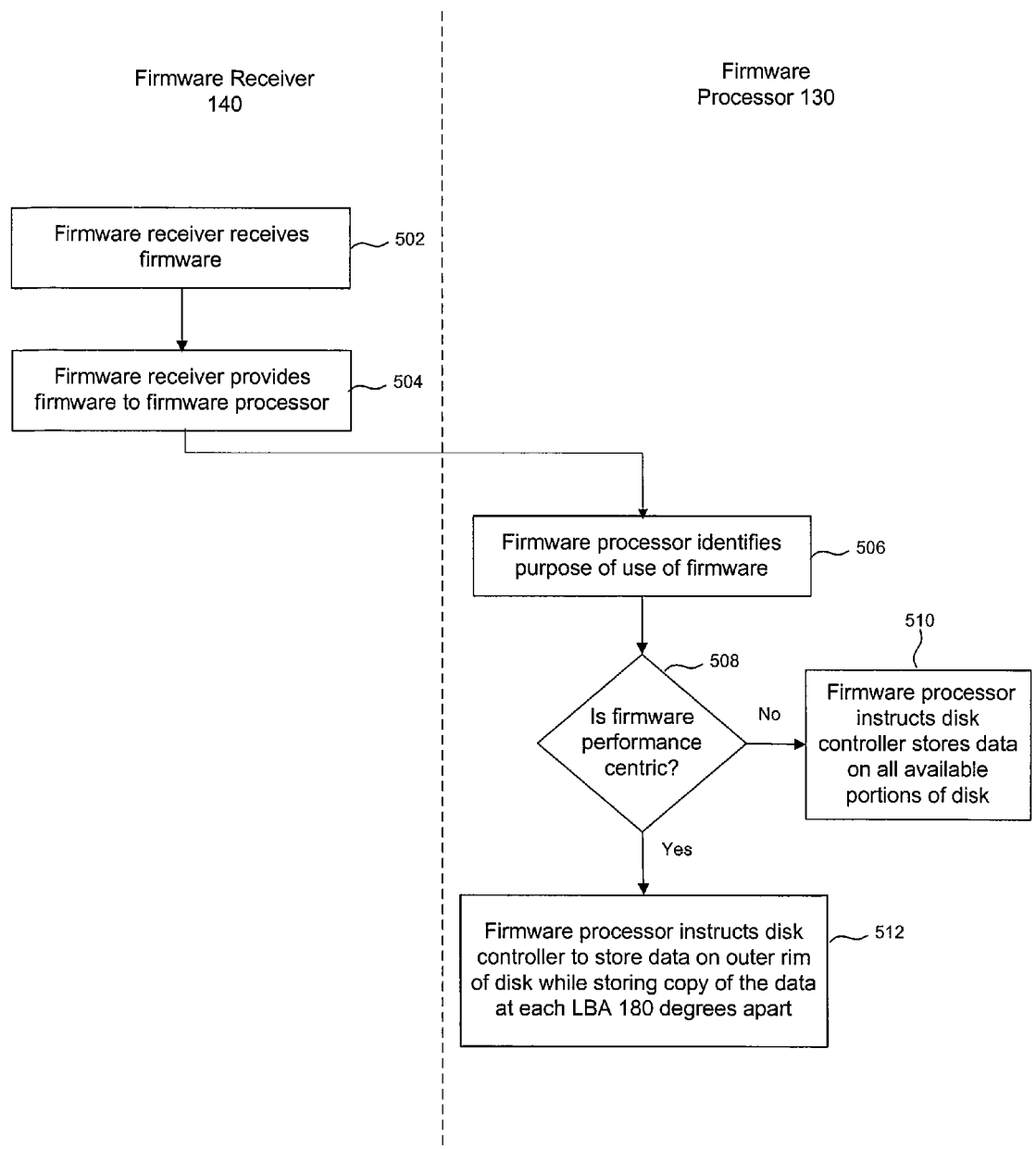
FIG. 5 is flowchart illustrating processing of firmware, according to an embodiment of the invention.

FIG. 5 illustrates method 500 that may be used to configure disk drive 110 for performance centric or storage centric mode.

Method 500 begins with firmware receiver 140 receiving firmware (step 502). As an example, firmware receiver 140 may receive firmware from a user. Furthermore, firmware receiver may read firmware from a memory where it may be stored by a user.

Firmware receiver 140 may then provide the firmware to firmware processor 130 (step 504).

Firmware processor 140 then identifies the purpose of use of the firmware (step 506). Firmware processor 140 then checks if the firmware is performance-centric (step 508).

If the firmware is not performance-centric (step 508), firmware processor 140 instructs disk controller 120 to store data at all available LBAs of a disk associated with disk drive 110 (step 510). As an example, storing data at all available LBAs of a disk may maximize the amount of data that is stored on disk drive 110.

If the firmware is performance-centric (step 508), firmware processor 140 instructs disk controller 120 to store data at a first logical block address and a copy of the data at a second logical block address such that the second logical block address is at a location on the disk which is one hundred and eighty degrees apart from a location of the first logical block address on an region of the disk (step 512). As an example, since data and a copy of the same data are stored one hundred and eighty degrees apart, data is more likely to be read and retrieved by data reader/writer 230 while it is traversing disk 400 to locate the data. This is because data or a copy of the data may always be available at a location that is requires data reader/writer 230 to traverse less one hundred and eighty degrees of disk 400.

In this way, disk drive 110 is configured in a performance-centric or a storage-centric mode based on firmware. When in performance-centric use, disk drive 110 is optimized for performance-centric operation. Furthermore, when a computer system is redeployed from performance-centric use to a storage-centric use, disk drive 110 is optimized for storage centric use.

6. CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for controlling a disk drive comprising:
   receiving firmware configured to control the disk drive;
   identifying whether the received firmware corresponds to a performance mode or a storage mode of disk drive operation;
   configuring the disk drive in a performance mode or a storage mode based on the identification, wherein original data can be written to a disk of the disk drive in the performance mode and the storage mode;
   providing instructions configured to store the original data and at least one mirror copy of the original data on an outer region of the disk, when the received firmware corresponds to the performance mode; and providing instructions configured to store the original data throughout the disk, including all inner and outer regions, when the received firmware corresponds to the storage mode.

2. The method of claim 1, wherein the performance mode comprises:
storing the original data at first logical block address and a copy of the original data at a second logical block address such that the second logical block address is at a location on the disk associated with the disk drive which is one hundred and eighty degrees apart from a location of the first logical block address on an outer region of the disk.

3. The method of claim 1, wherein the storage mode comprises:
storing the original data at any available logical block address on the disk.

4. The method of claim 1, further comprising:
operating the disk drive in the storage mode or the performance mode based on the identifying.

5. The method of claim 1, further comprising:
storing the original data and at least one mirror copy of the original data on an outer region of a disk, when the received firmware corresponds to the performance mode; and
storing the original data throughout the disk, including all inner and outer regions, when the received firmware corresponds to the storage mode.

6. A system for controlling a disk drive comprising:
a firmware receiver configured to receive firmware to control the disk drive;
a firmware processor configured to identify whether the received firmware corresponds to a performance mode or a storage mode of disk drive operation;
a disk controller configured to operate the disk drive in a performance mode or a storage mode in accordance with the mode identified by the firmware processor, wherein original data can be written to a disk of the disk drive in the performance mode and the storage mode; and
a data writer to store the original data and at least one mirror copy of the original data on an outer region of the disk, when the disk drive is operated in the performance mode and to store data throughout the disk, including all inner and outer regions, when the disk drive is operated in the storage mode.

7. The system of claim 6, wherein the disk controller further comprises:
a spindle controller configured to control movement of a spindle associated with the disk drive;
a servo controller configured to control a servo motor;
a port configured to interface the disk drive to one or more devices;
a controller configured to control the operation of the port;
a memory configured to store data associated with the disk controller;
a processor configured to control the operation of the disk controller; and
a data reader/writer configured to write data to the disk and read data from the disk.

* * * * *